Aug. 29, 1961 R. C. HOFFMAN 2,998,262
INDEPENDENT SUSPENSION FOR STEERABLE WHEELS
AND METHOD OF CONSTRUCTION THEREOF
Filed May 13, 1954 3 Sheets-Sheet 3
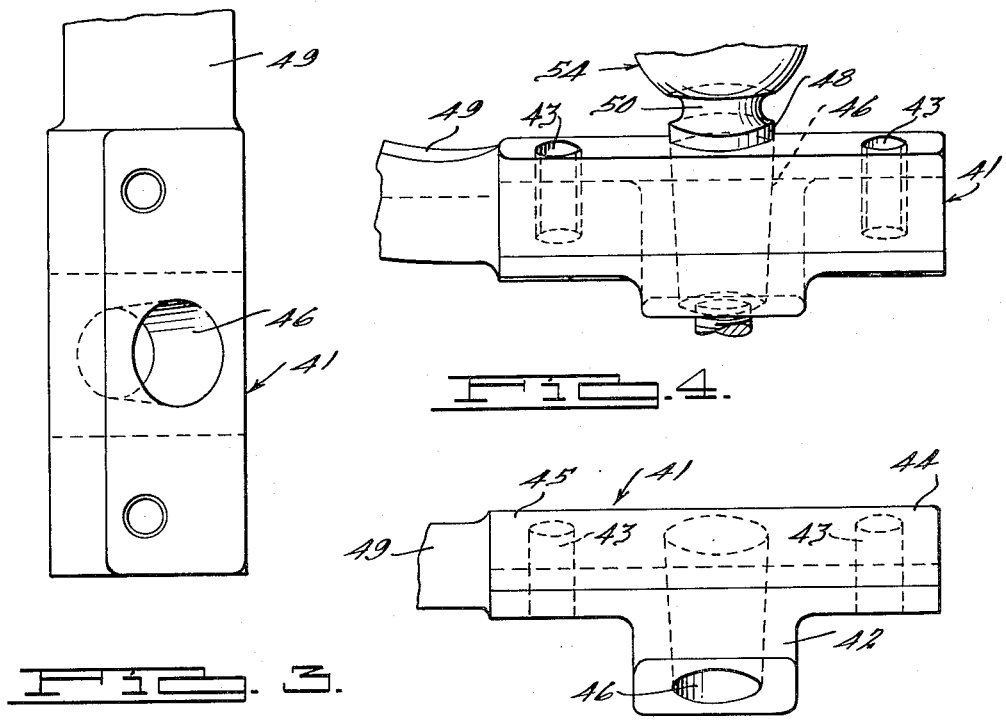
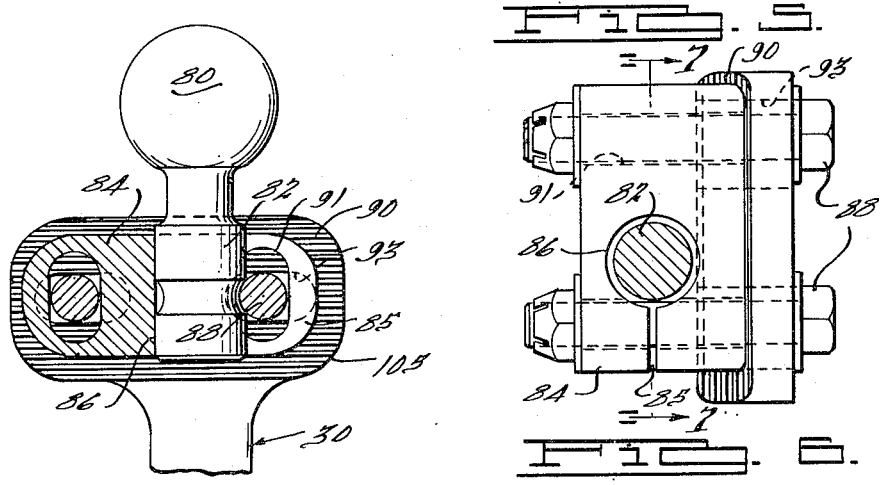
INVENTOR.
Roscoe C. Hoffman
BY
Harness, Dickey & Pierce.
ATTORNEYS.

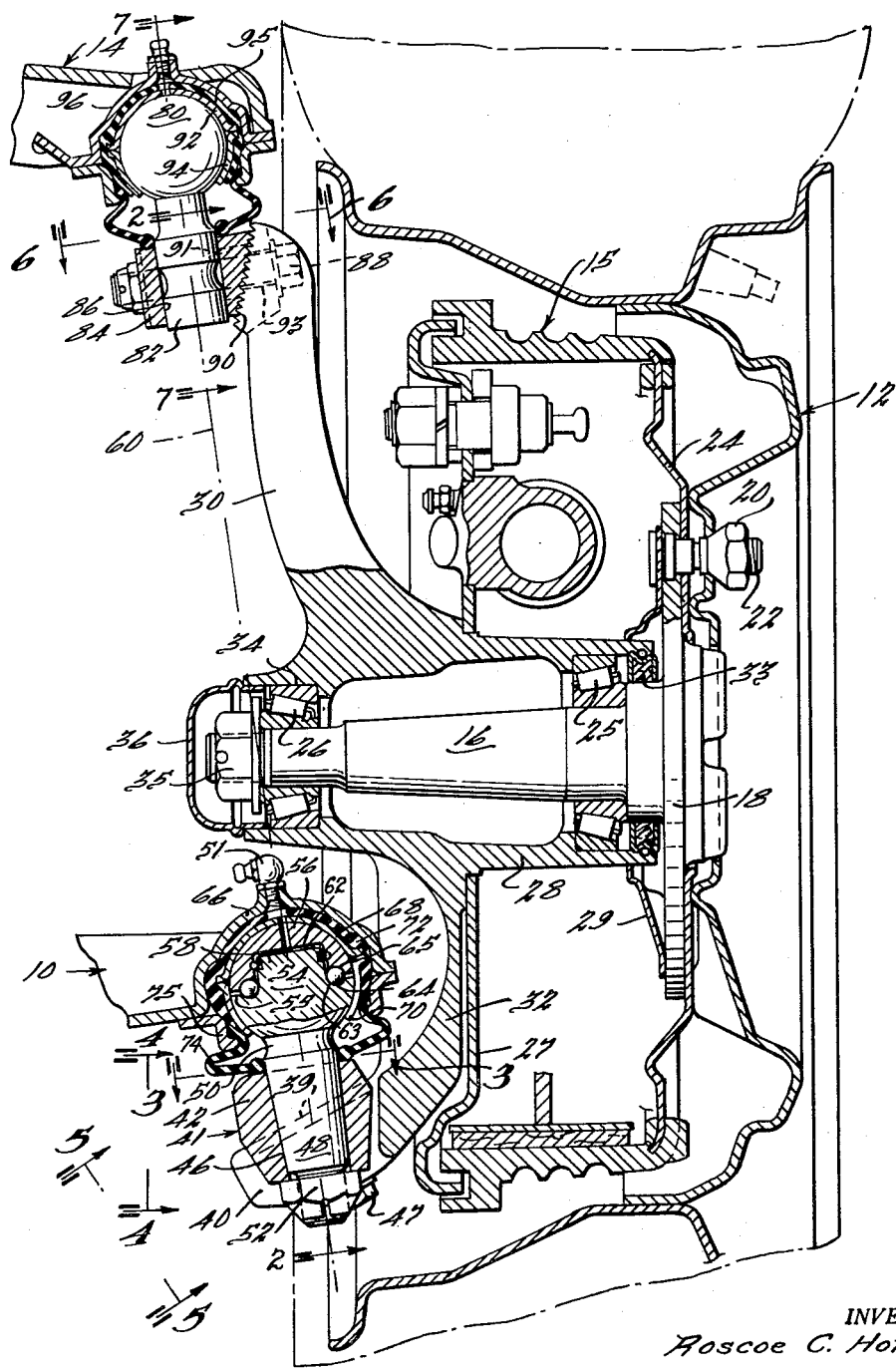

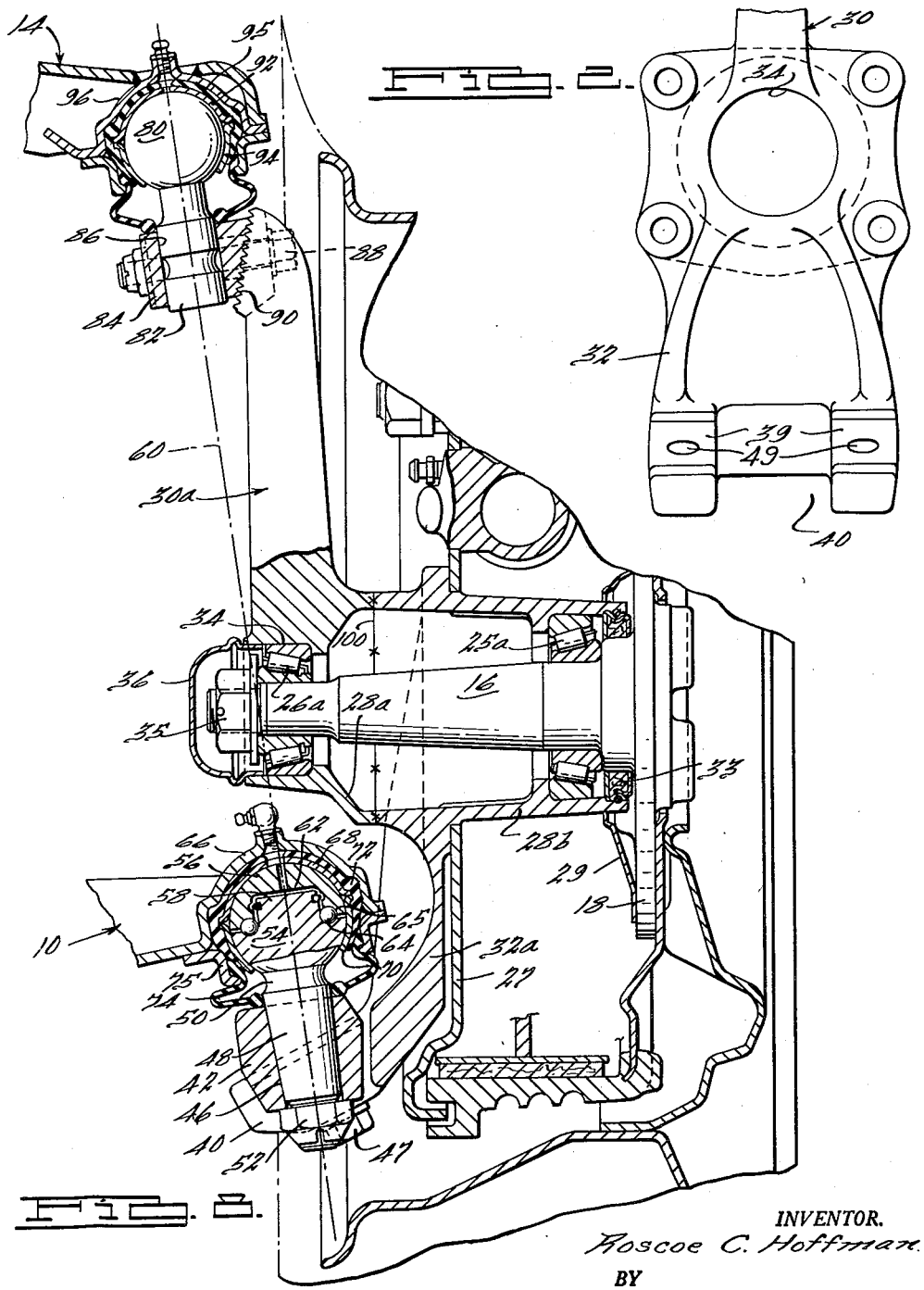

United States Patent Office 2,998,262
Patented Aug. 29, 1961

2,998,262
INDEPENDENT SUSPENSION FOR STEERABLE WHEELS AND METHOD OF CONSTRUCTION THEREOF
Roscoe C. Hoffman, 405 Lodge Drive, Detroit, Mich.
Filed May 13, 1954, Ser. No. 429,466
5 Claims. (Cl. 280—96.1)

This invention relates to vehicle wheel suspension, and particularly to improvements in suspension mechanisms for the steerable wheels of motor vehicles.

An important object of the invention is to provide an improved suspension structure for dirigible independently sprung vehicle wheels, requiring no kingpin and adapted for use with various types of articulating joints for connecting the suspension arms to the wheel structure, and which also permits the use of any of various types of wheels.

Another object is to provide such a suspension mechanism which is simple and inexpensive to construct and assemble, but of great strength, which presents a minimum of interference with the flow of air around the wheel brake, and which is adapted for use with ball-type universal joints for connecting the wheel mounting to the control arms, the arrangement being such that the ball joint which carries the vehicle load has an effective load-carrying surface comprising a full hemisphere.

Still another object is the provision of such a suspension which is adapted for use with cushioned ball joints of the types disclosed in my Patent No. 2,631,865, granted March 17, 1953, and in my copending applications Serial No. 266,501, filed January 15, 1952, now Patent No. 2,752,178, and Serial No. 428,678, filed May 10, 1954, now abandoned.

Another object is to provide an improved method of constructing such a suspension structure.

Other objects and advantages of the invention will become apparent upon consideration of the present disclosure in its entirety.

In the drawings:

FIGURE 1 is a sectional elevational view, partly broken away, of a steerable wheel and suspension portions incorporating the principles of the present invention, taken substantially in a vertical diametric plane, but with certain parts shown in side elevation;

FIG. 2 is an elevational view of my improved steering knuckle support structure shown separately from the other elements and looking in the direction indicated by the line and arrows 2—2 of FIG. 1;

FIGS. 3, 4 and 5 are elevational views of the forward end of the combined steering arm and lower ball support, shown separately from the other elements, viewed as indicated by the lines and arrows 3—3, 4—4 and 5—5 respectively of FIG. 1;

FIG. 6 is a sectional plan view of the upper ball support and adjacent parts, taken substantially on the line 6—6 of FIG. 1, and looking in the direction of the arrows;

FIG. 7 is a sectional elevational view taken substantially on the line 7—7 of FIG. 1, and looking in the direction of the arrows; and FIG. 8 is a view similar to FIG. 1 but partly broken away, showing a modification.

Referring now to the drawings, and particularly to FIGS. 1–7 inclusive, reference character 10 designates generally the lower control arm of an independent suspension system for a steerable wheel 12, the upper control arm also being fragmentarily illustrated and generally designated 14. The details of construction of the control arms and the wheel structure form no part of my present invention and are subject to wide variation, as will be apparent, and the details of the brake mechanism, generally designated 15, may also be varied widely. The wheel is preferably of the type having a rotary spindle as 16 projecting inwardly with respect to the vehicle, the wheel spindle having an integral flange 18 at its outer end to which the wheel is secured as by the wheel studs 22 and nuts 20. The wheel studs 22 also serve to support the brake drum web 24, as shown in FIG. 1.

The spindle 16 is journaled in antifriction bearings 25, 26 fitted in opposite ends of a tubular bearing support portion 28 which, as shown in FIG. 1, is forged integrally with a pair of supporting arms 30, 32; arm 30 extending upwardly for articulation to the upper control arm 14 and arm 32 extending downwardly for articulation to the lower control arm 10. The tubular bearing supporting portion 28 is counterbored inwardly from its outer end to accommodate the bearing assembly 25 and the lubricant retainer 33, and is counterbored in the opposite direction from its inner end as indicated at 34 to accommodate the inner wheel bearing assembly 26, or, alternatively, these bearing receiving recesses may be formed by induction heating and coining the tubular ends. This process is sometimes termed "hot upsetting." The spindle 16 projects through the bearing assembly 26 and is retained by a wheel nut 35 over which a knock-off dust cover 36 may be fitted as shown.

The lower arm 32 extends downwardly to a position below the control arm and then inwardly of the vehicle, spacedly beneath the outer end of the control arm, and is bifurcated at its lower end, as indicated at 40, to receive between its bifurcated ends a vertically thickened hub portion 42 of a supporting block 41 for the lower ball joint assembly. Block 41 has thinner forwardly and rearwardly extending portions 44, 45 (FIGS. 4 and 5) overlapping the top surfaces 39 of the bifurcated extremities of the lower arm 32, and rigidly attached thereto as by screws 47 which project upwardly through holes (49—FIG. 2) in the extremities of the bifurcated arm portion from below, and into suitably tapped holes 43 in the portions 44, 45. The central block portion 42 of the retainer is provided with a downwardly decreasingly tapered aperture 46 extending therethrough and having its axis substantially coincident with the intended steering axis. The steering arm 49 is preferably integral with the ball supporting block 41 as shown.

The aperture 46 in central portion 42 of block 41 serves as a seat for the conformably tapered stem portion 48 which supports the ball of the lower universal joint, being integral with the ball and connected thereto by a reduced neck 50. The stem 48 has a threaded lower extremity projecting below the central block portion 42 and the stem is tightly held in the block by a nut 52 fitted on such threaded lower extremity.

It will be seen that the arm 32 is of substantially channeled section, in the area between the tubular bearing support portion 28 and the bifurcated lower end thereof, and the channeled contour provides a recess into which the ball and socket joint assembly projects. The channel is wide enough to clear the ball and socket assembly, lubricant nipple 51 and the adjacent portions of the arm 10 at all times during springing and steering movements.

In a commonly used type of suspension wherein the vehicle spring imposes the vehicle load on the lower control arm, such loading increases the pressure between the parts which must swivel during steering, and it will be perceived that where ball joints are employed as in the preferred embodiments herein depicted, although the friction between the parts which swivel during steering is considerably reduced due to the wide vertical spacing between the upper and lower ball joints, as compared with constructions of the kingpin type, the friction resulting from vehicle loading is largely imposed on the lower joint. In order to reduce such friction and the steering effort, I preferably form the ball in two sections and provide antifriction bearing means between such sections. The lower ball section, generally designated 54, is integral with the stem and neck 48, 50 and has an outer spherical surface which is somewhat less than hemispherical in extent and which extends upwardly to, and terminates at, a plane designated 55 which is perpendicular to the steering axis 60 and which lies somewhat below the center of the ball. The upper ball section 56 is also concentric with the steering axis and its surface is somewhat more than hemispherical in extent and proportioned to coact with the lower section 54 to complete the ball surface. The lower ball section has a reduced integral upwardly extending cylindrical portion 58 also concentric with the steering axis and which extends into a conforming and somewhat larger cylindrical recess 62 in the upper ball section 56. The juncture of the cylindrical wall of portion 58 and the planar portion 55 is of partially toroidal form to define a raceway 63 which accommodates antifriction balls 64, which also run in a conformably contoured partly toroidal race portion 65 in the opposing corner of the cap-like upper ball portion 56. The parts are so proportioned that the antifriction balls 64 maintain clearance between all of the surfaces of the two socket ball sections 54, 56, and the upper ball section 56 accordingly turns freely on the lower ball section, on the steering axis. The details of such a ball construction are disclosed in my copending application, Serial No. 428,678, filed May 10, 1954.

The end portion of the sheet metal control arm 10 is embossed upwardly to define a generally hemispherical, downwardly opening socket housing 66, within which is fitted a socket bearing liner shell structure comprising an upper shell section 68 and a lower shell section 70, and a stretched and radially compressed elastic cushioning liner 72 interposed between the shell sections and the shell housing 66. The socket sections are held in frictionally embracing relation with the ball by a retaining ring 75 encircling the lower ball and socket portions and which also serves to secure the upper end of an elastic lubricant retaining sleeve 74.

The upper end of the arm 30 is articulated to the control arm 14 by a ball and socket joint which is also of a type disclosed in my aforementioned copending applications. The ball portion 80 is integral with a cylindrical supporting stem 82 which is held in a socket 86 in a split-type clamping block 84. The slot in the block intersecting socket 86 is designated 85, and the sections thus defined are adapted to be rigidly tightened against the stem 82, and also secured to the upper extremity of the arm 30, by means of a pair of bolts 88, each of which extends through aligned slots 91, 93, in the block 84, and arm 30, respectively, one such bolt being arranged on each side of the stem 82.

The abutting surfaces of the block 84 and arm 30 may be longitudinally serrated as indicated at 90 to assist in rigidly locking the parts against disalignment. The longitudinally serrated surfaces are inclined outwardly toward the top, away from the steering axis, and the bolts 88 which secure the clamping block assembly 84 to the upper end of the steering knuckle support 30 extend through slots 91 in the block 84 which are elongated vertically, and through slots 93 in the upper pad portion 105 of the support 30 which are elongated longitudinally of the vehicle. Thus when the bolts 88 are loosened, the upper end of the arm 30 can be moved longitudinally, to adjust the caster angle, and the clamping block 84 and serrated arm surfaces 90 can also be adjusted vertically. Such vertical adjustment, due to the inclination of such serrated surfaces, inclines the upper portion of the wheel inwardly or outwardly, to adjust the camber angle.

The ball portion 80 may be rockable and rotatable in a composite cushioned bearing socket assembly including bearing liner shells 92, 94, elastic cushioning liner 95 and socket housing 96, the latter secured as by welding within and near the outer end of the downwardly opening channel-shaped control arm 14.

By separating the ball supporting portions 41, 84, etc., from their respective supporting arms 32, 30, in the manner disclosed, the length and complexity of the double-armed wheel supporting forging are greatly reduced. As shown in FIG. 1, the bearing supporting tubular portion 28 is formed in one piece, and is integral with both of the arms 30, 32. In so far as the bearing supporting portion 28 is concerned, it will be seen that the only portions which may require machining after forging comprise the seats for the wheel bearings 25, 26, and lubricant retainer 33, the serrated and clamping surfaces 90, 39, and the surfaces which are engaged by the brake backing plate 27 and the wiping ring 29, but the need for machining or grinding may be eliminated by hot coining, as noted previously. The forged opening in the tubular portion 28 is of gradually increasing diameter toward the outer extremity, which lends itself to easy finishing.

In the modified construction shown in FIG. 8, the upper arm 30a is formed integrally with a tubular section 28a which forms the inner extremity of the tubular bearing support, and which is adapted to receive the inner wheel bearing assembly 26a, while the downwardly projecting arm 32a is formed integrally with an outer tubular section 28b which is welded in end-abutting relation to tubular section 28a defining a coaxial continuation thereof and coacting therewith to form the tubular wheel bearing support. The two tubular sections 28a, 28b, are secured together, as by butt welding, on a transverse plane, designated 100, located at a position between the points of connection of the arms 30a and 32a to the composite tube structure.

With this construction the tubular portions 28a, 28b, are preferably of maximum diameter in the area of the weld at the plane 100, and tapered to decreasing diameter away from such weld, maximum strength being thereby provided.

Other portions of this second embodiment of the invention may correspond to those of the first embodiment, and such corresponding portions are designated by like reference characters, and will require no detailed redescription.

While it will be apparent that the preferred embodiments of the invention herein described are well calculated to fulfill the objects and advantages first above stated, it will be appreciated that the invention is susceptible to variation, modification and change without departing from the fair meaning and proper scope of the appended claims.

I claim:

1. The method of forming a support for a dirigible vehicle wheel, which comprises forging two mating tubular wheel bearing portions each having an integral arm extending generally radially therefrom, each of said arms having a coupling portion at its end remote from the tubular portion, and welding said tubular portions together in substantially colinear relation and with said arms projecting in opposite directions.

2. The method of forming a support for a dirigible vehicle wheel, which comprises forging two mating tubular wheel bearing portions each having an integral arm extending generally radially therefrom, each of said arms having a coupling portion at its end remote from the tubular portion, and butt welding said tubular portions together in substantially colinear relation and with said arms projecting in opposite directions.

3. Supporting means for a steerable wheel, comprising in combination with a pair of spacedly superposed control arms and a rotable wheel spindle, a wheel bearing supporting structure comprising a tubular forged portion constituting a complete bearing support and housing portion for the rotatable spindle and a pair of arms integrally forged with and projecting from peripheral areas of such portion, one of such arms projecting upwardly and the other of such arms projecting downwardly from said areas, each of said arms having a terminal coupling part, an articulating universal joint structure supported by each arm and each comprising a ball portion and a socket portion, a coupling part attached to one of said ball portions for securing it to the coupling part of the upper arm, and a coupling part attached to the ball portion of the other joint structure for securing it to the coupling part of the lower arm, whereby said arms may be articulated to the control arms, said tubular housing portion being formed in two butt welded sections, one of said arms being integral with each of said sections.

4. Supporting means for a steerable wheel, comprising in combination with a pair of spacedly superposed control arms and a rotatable wheel spindle, a wheel bearing supporting structure comprising a tubular forged portion constituting a complete bearing support and housing portion for the rotatable spindle and a pair of arms integrally forged with and projecting from peripheral areas of such portion, one of such arms projecting upwardly and the other of such arms projecting downwardly from said areas, each of said arms having a terminal coupling part, an articulating universal joint structure supported by each arm and each comprising a ball portion and a socket portion, a coupling part attached to one of said ball portions for securing it to the coupling part of the upper arm, and a coupling part attached to the ball portion of the other joint structure for securing it to the coupling part of the lower arm, whereby said arms may be articulated to the control arms, said tubular housing portion being formed in two annular sections butt welded together in axially aligned relation, one of such arms being integral with each of said sections.

5. Supporting means for a steerable wheel, comprising in combination with a pair of spacedly superposed control arms and a rotatable wheel spindle, a wheel bearing supporting structure comprising a tubular forged portion constituting a complete bearing support and housing portion for the rotatable spindle and a pair of arms integrally forged with and projecting from peripheral areas of such portion, one of such arms projecting upwardly and the other of such arms projecting downwardly from said areas, each of said arms having a terminal coupling part, an articulating universal joint structure supported by each arm and each comprising a ball portion and a socket portion, a coupling part attached to one of said ball portions for securing it to the coupling part of the upper arm, and a coupling part attached to the ball portion of the other joint structure for securing it to the coupling part of the lower arm, whereby said arms may be articulated to the control arms, said tubular housing portion comprising two annular sections including an inner section and an outer section butt welded together in axially aligned relation, the upwardly projecting arm being integral with the inner section and the downwardly projecting arm being integral with the outer section.

References Cited in the file of this patent

UNITED STATES PATENTS

| | | |
|---|---|---|
| 1,350,829 | Murray | Aug. 24, 1920 |
| 2,011,121 | Sherman et al. | Aug. 13, 1935 |
| 2,153,287 | Wallace et al. | Apr. 4, 1939 |
| 2,580,383 | Frank | Jan. 1, 1952 |
| 2,631,865 | Hoffman | Mar. 17, 1953 |
| 2,674,783 | Schneider et al. | Apr. 13, 1954 |

FOREIGN PATENTS

| | | |
|---|---|---|
| 603,831 | Great Britain | June 23, 1948 |